United States Patent [19]

Howard

[11] Patent Number: 4,847,552
[45] Date of Patent: Jul. 11, 1989

[54] DETECTION OF ELECTRICALLY CONDUCTIVE MATERIALS BENEATH SURFACE COATINGS EMPLOYING EDDY CURRENTS

[75] Inventor: Bruce S. Howard, Mercer Island, Wash.

[73] Assignee: The Boeing Company, Seattle, Wash.

[21] Appl. No.: 70,409

[22] Filed: Jul. 7, 1987

[51] Int. Cl.$^4$ ............................................. G01V 3/08
[52] U.S. Cl. ..................................... 324/67; 324/327; 324/236
[58] Field of Search .................... 324/66, 67, 326–329, 324/226, 228, 229–233, 234–242, 260, 262, DIG. 1

[56] References Cited

U.S. PATENT DOCUMENTS

| | | |
|---|---|---|
| Re. 27,711 | 2/1941 | Blake . |
| 1,126,027 | 1/1915 | Jüllig . |
| 1,150,799 | 8/1915 | Wood . |
| 1,289,418 | 12/1918 | Elmen . |
| 1,812,392 | 6/1931 | Zuschlag . |
| 2,129,058 | 9/1938 | Hedden . |
| 2,358,027 | 9/1944 | Penther et al. . |
| 2,994,015 | 7/1961 | Eidam .............................. 324/229 X |
| 3,487,306 | 12/1969 | Harmer . |
| 3,611,119 | 10/1971 | Madewell ....................... 324/234 X |
| 3,704,413 | 11/1972 | Blevins .................................. 324/67 |
| 4,084,136 | 4/1978 | Libby et al. ......................... 324/238 |
| 4,095,181 | 6/1978 | Harris et al. ........................ 324/238 |
| 4,107,605 | 8/1978 | Hudgell ........................... 324/238 X |
| 4,206,391 | 6/1980 | Varacins ........................... 324/262 X |
| 4,300,094 | 11/1981 | Piso et al. . |
| 4,326,166 | 4/1982 | Pigeon et al. ................... 324/233 X |

OTHER PUBLICATIONS

Whitehead, "Metal Pipe or Wiring Locator", *Practical Electronics*, vol. 12, No. 12, pp. 952–955, Dec. 1976.

Primary Examiner—Reinhard J. Eisenzopf
Assistant Examiner—Warren S. Edmonds
Attorney, Agent, or Firm—Dellett, Smith-Hill & Bedell

[57] ABSTRACT

A metal body located below a metal surface layer is detected by energizing inductance coils in a bridge circuit at a frequency below 10 KHz to avoid skin effect as one of the coils is placed proximate said body. A threshold circuit determines when bridge unbalance is caused by other than the surface layer and provides positive identification of the metal body.

10 Claims, 3 Drawing Sheets

DETECTION OF ELECTRICALLY CONDUCTIVE MATERIALS BENEATH SURFACE COATINGS EMPLOYING EDDY CURRENTS

BACKGROUND OF THE INVENTION

The present invention relates to a method and apparatus for detecting electrically conductive material beneath surface coatings and particularly to such a method and apparatus characterized by low cost and ease of operation.

Exterior surface structures of large aircraft, rather than being formed entirely of metal, are instead constructed of a variety of materials that may be painted or otherwise covered with a uniform surface layer or coating. It is difficult or impossible to differentiate externally between painted aluminum and painted graphite epoxy or Kevlar airframe structures. However, it is essential in maintaining the aircraft that service personnel be able to detect the difference. Of course, a painted surface may be scraped away in order to reveal the subsurface material but such a destructive approach is obviously undesirable and would require resurfacing.

A variety of apparatus is available for detection of metal objects, e.g., "stud finders" for locating an object within a plaster or wallboard constructed building. However, these devices generally react to the edge of a conductive or magnetic material and give no reliable indication of the presence of a broad conductive plane under a coating layer. That is, it is difficult to provide a discernable output which will distinctly inform the operator as to whether a large metallic subsurface layer is really present. Moreover, the prior art devices of this type may react to surface paint itself. Airframe structures are often provided with flame sprayed aluminum coatings that tend to bring about a false detection output especially when an edge thereof is encountered.

Higher priced electrical conductivity instruments are available which are adapted to measure electrical conductivity. These instruments must be accurately positioned with respect to the object under test, and are often adjusted to determine electrical conductvity over a narrow range of "lift off", rendering detection difficult through non-conductive coatings and the like. Also, such devices require interpretation of results in order to ascertain the presence of a metallic underlayer.

Many prior art devices operate at comparatively high frequencies, for example above 10 KHz, causing the field produced thereby to be subject to "skin effect", i.e., confined principally to the surface of a metal body being measured or detected. In the case of aluminum coatings on airframe structures, it is precisely the shallow surface region which one wishes to ignore. It would thus be desirable to provide a method and apparatus capable of avoiding measurement of surface coatings while penetrating more deeply into the structure in order to ascertain the nature of the subsurface material.

It is therefore an object of the present invention to provide an improved method and apparatus for detecting electrically conductive materials beneath surface coatings.

It is another object of the present invention to provide an improved method and apparatus for detecting electrically conductive materials in a manner providing a definitive indication of such materials at a predetermined depth.

It is another object of the present invention to provide an improved method and apparatus for detecting electrically conductive materials in a manner which does not produce a false indication on the basis of a metallic overlayer or paint.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

Figure 1:
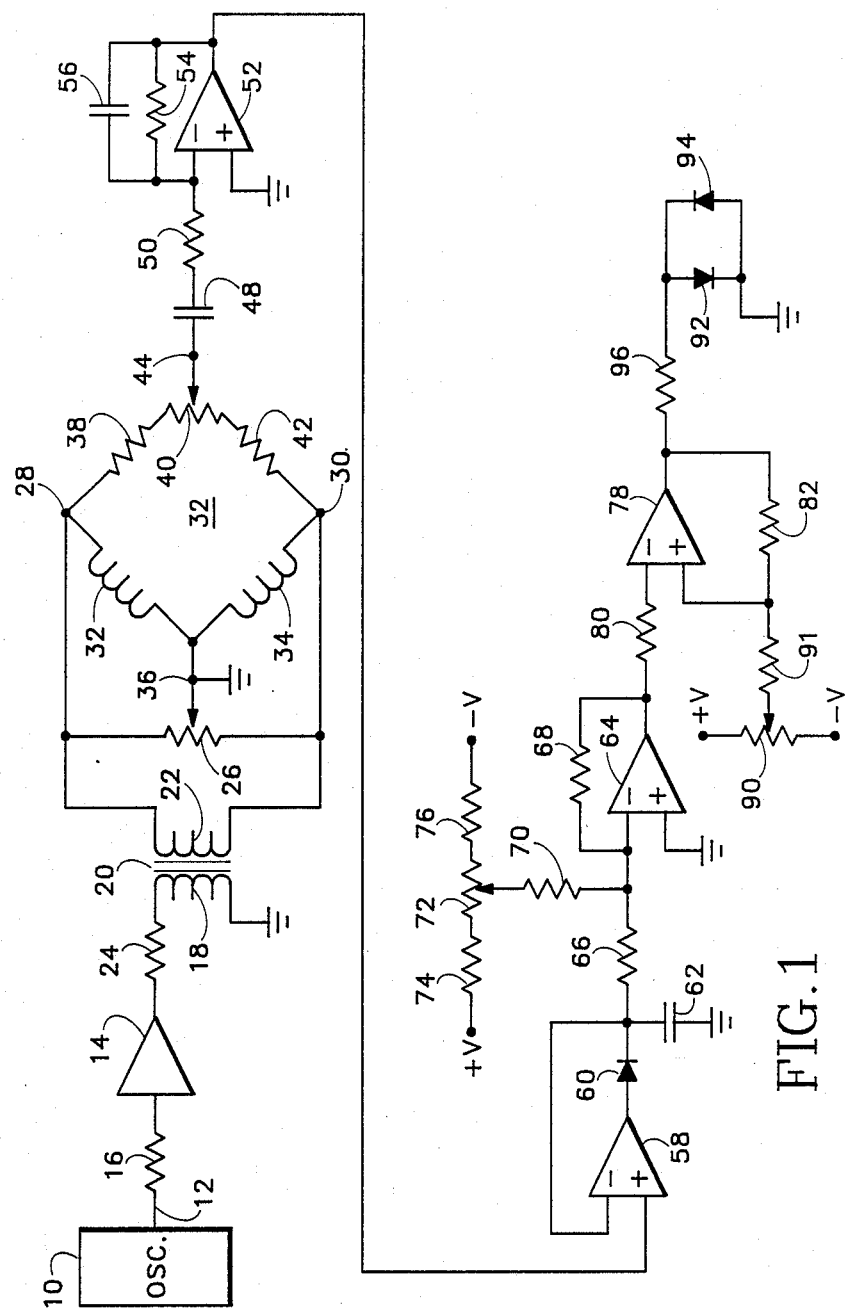
FIG. 1 is a schematic diagram of a detecting device according to the present invention.
Figure 2:
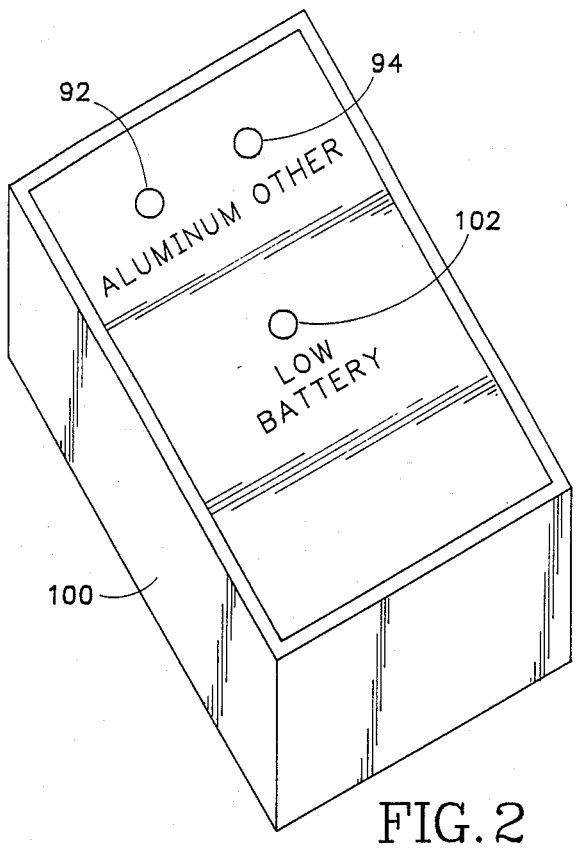
FIG. 2 is a perspective view of the outer case of the device according to the present invention.
Figure 3:
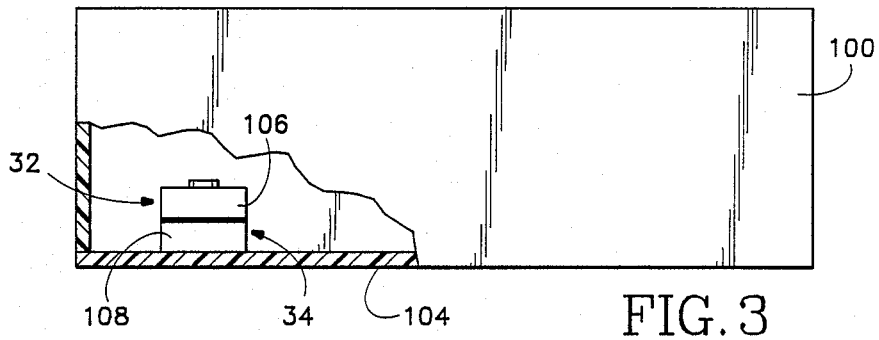
FIG. 3 is a side view, partially broken away, of the FIG. 2 case.

Referring to the drawings and particularly to FIG. 1, comprising a schematic diagram of apparatus according to the present invention, oscillator 10, supplying a sinusoidal output on lead 12 at a frequency below 10 KHz and preferably approximately 4.5 KHz, is coupled to the input of amplifier 14 via the latter's input resistor 16. The output of amplifier 14 is suitably approximately 4 volts peak-to-peak at the aforementioned frequency and drives the primary winding 18 of transformer 20 by way of a coupling resistor 24. Transformer 20 has a secondary winding 22 also wound on the feroxcube core of the transformer providing a one-to-one transformer ratio. The secondary of the transformer is connected across a first potentiometer 26 and also across a pair of opposite terminals 28 and 30 of bridge circuit 32. Between terminals 28 and 30 there is disposed a series connection of induction "reference" coil 32 and induction "search" coil 34, with the interconnection therebetween providing a grounded first conjugate terminal 36 of the bridge. The movable tap of potentiometer 26 is also grounded. Bridge 32 further comprises resistor 38, potentiometer 40, and resistor 42 connected in series between terminals 28 and 30. The movable tap of potentiometer 40 provides second conjugate terminal 44 of the bridge, the latter being coupled via capacitor 48 and resistor 50 in series to an input of amplifier 52. Amplifier 52 suitably provides a gain of about 200 and includes a feedback circuit including resistor 54 and parallel capacitor 56, sized relative to the input circuit to provdie the aforementioned gain.

The output of amplifier 52 is coupled to unity gain amplifier 58 which drives rectifier 60 having its anode connected to the output of the amplifier and its cathode connected to filter capacitor 62. The bridge 32 output signal contains both phase and amplitude information, but in the present embodiment only amplitude information is utilized. The AC output of the bridge is thus converted to a DC signal whose amplitude is proportional to the AC output of the bridge, via the rectifier 60 and associated circuitry.

The cathode of rectifier 60 is further coupled to an input terminal of amplifier 64 by way of resistor 66, while a feedback resistor 68 is provided for setting amplifier gain to approximately 4.75. The same input terminal is coupled by resistor 70 to the movable tap of potentiometer 72 disposed in series between resistors 74 and 76 which have their remote terminals connected to a positive voltage source and a negative voltage source respectively.

The output of amplifier 64 drives amplifier 78, coupled as a comparator, via input resistor 80. Feedback resistor 82 is disposed between the output of amplifier 78 and the remaining input thereof, while the last mentioned input is additionally connected to the movable tap of potentiometer 90 through resistor 91. The end points of potentiometer 90 are connected to positive and negative voltage sources as shown. The output of amplifier 78 is coupled to a pair of light emitting diodes 92 and 94 by way of resistor 96, with the remaining terminals of the LEDs being grounded. The anode of diode 92 is coupled to the output of amplifier 78 and provides an indication when a conducting, i.e., aluminum, underlayer is detected. Amplifier 78 provides a positive output for energizing LED 92 when the DC signal from rectifier 60 (and coupled by amplifier 64) exceeds a threshold value set by potentiometer 90. The cathode of diode 94 is also coupled to the output of amplifer 78 and is energized to provide an "other" indication when the DC signal from rectifier 60 is negative or less than the threshold voltage set by potentiometer 90.

The function and placement of inductance coils 32 and 34 will be further discussed with reference to FIGS. 2, 3, 4A and 4B. The circuitry of FIG. 1, as well as a battery power supply therefor, is housed in a case 100 suitably formed of bakelite or other insulating material. The light emitting diodes 92 and 94 are visible at the top of the case. A light emitting diode 102 is also suitably provided for indicating (by means not shown) a low battery condition. Internal batteries provide balanced positive and negative voltages for the circuitry of FIG. 1.

Figure 4A:
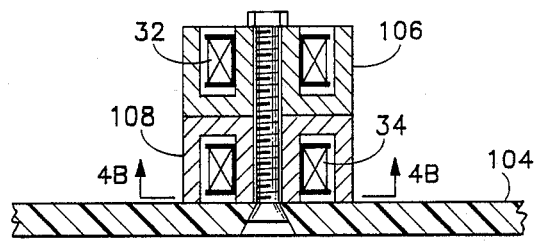
FIGS. 4A and 4B are a detailed sectional view of operating coils employed according to the present invention.
Figure 4B:
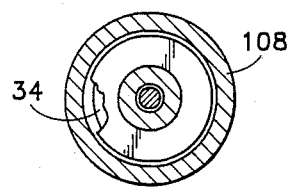

Mounted at the bottom of case 100 on bakelite panel 104 thereof are inductance coils 32 and 34 positioned back to back in half pot cores 106 and 108 illustrated in cross-section in FIGS. 4A and 4B. Search coil 34 is mounted with the open end of its half pot core 108 facing downwardly toward bakelite panel 104 in such manner that it can come into close proximity with structure being tested, i.e., when the back panel 104 of case 100 is positioined thereagainst. Reference coil 32 is identical to search coil 34 but is magnetically isolated from the search coil, as well as the metallic structure being searched, by virtue of the upward orientation of its half pot core 106. Each of the coils in a particular embodiment consisted of 200 turns of number 37 wire on a feroxcube bobbin positioned in a feroxcube half pot core as shown.

In operation, it will be seen transformer 200 provides balanced drive at the operating frequency of oscillator 10 to the input terminals 28 and 30 of bridge 32. Potentiometes 26 and 40 are adjusted to null the output of the bridge, as measured at the movable terminal of potentiometer 40, when the entire instrument is away from an electrically conductive body or the like. The output of the bridge taken between conjugate terminals 44 and 36 increases due to bridge imbalance when the impedance of coil 34 changes with respect to reference coil 32, as case 100 is placed such that electrically conductive material is in proximity to the open faced pot core 108 containing coil 34. The change in impedance is occasioned by losses due to eddy currents excited in the conductive material.

Bridge output between terminals 44 and 36 increases as a function of material thickness and tends to saturate amplifier 52 at a material thickness greater than approximately 20 mils. With the bridge operating frequency of below 10 KHz, and particularly in the vicinity of 4.5 KHz, the effects of thin conductive materials such as flame sprayed aluminum coatings are minimized because this lower frequency does not bring about the aforementioned skin effect problems as would restrict the depth of testing. As stated above, the bridge output increases with thickness of the material. Bridge output increases beyond the thicknesses of most coatings. The threshold of the device, determined by potentiometer 90, is then set sothat thin coatings of 10 mils or less can be substantially ignored, with the output of LED 92 being produced only in response to relatively thick aluminum of other metal underbodies.

The potentiometer 72 is utilized for nulling the output (as presented to amplifier 78) to approximately zero volts, with the instrument located in the air away from a metallic surface or the like. The adjustable threshold voltage from potentiometer 90 is set at approximately $-2$ volts in a particular embodiment for the purpose of ignoring thin coating layers.

Thus, the present invention provides simple and advantageous testing for the presence a metal underlayer beneath a painted surface even in the instance where the painted surface itself may be metal. The frequency of operation avoids the objectionable skin effect while setting a threshold enables the detection of a metal layer which will be more than a few mils thick. A positive identification of the metal underlayer is immediately supplied and does not require extensive interpretation by the operator.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:
1. The method of identifying metal in a body covered by a surface coating, comprising:
   energizing an inductance coil with an alternating current at a frequency below approximately 10 KHz for exciting eddy currents in said metal at a depth beyond said surface coating,
   establishing a threshold level for the impedance of said inductance coil below which substantially no conductive metal is indicated other than that of a surface coating and above which a larger portion of conductive metal is indicated, exceeding that of a surface coating, as a result of eddy currents excited in said metal,
   positioning said inducatance coil in close proximity to said body substantially on th surface coating thereof,
   detecting the change in impedance of said inductance coil exceeding said threshold level when said inductance coil is positioned in close proximity to said body characterized by said conductive metal covered by a surface coating as compared with the impedance of said inductance coil not so positioned, and providing an indication to an operator when said threshold level is exceeded.

2. The method according to claim 1 wherein said inductance coil is energized with an alternating current frequency of approximately 4.5 KHz.

3. The method accorrding to claim 1 wherein detecting said change in impedance is accomplished by balancing the impedance of said inductance coil in a bridge circuit including a second inductance coil and detecting when bridge balance changes as a result of the impedance of the first mentioned inductance coil changing by an amount exceeding said threshold level.

4. A method of testing for the presence of a subsurface conductive, non-ferromagnetic metal material within a body, comprising the steps of:
simultaneously energizing a pair of inductances disposed in a bridge circuit with an alternating current at a frequency below approximately 10 KHz to inhibit skin effect,
locating one of said inductances in close proximity to the surface of said body to excite eddy currents in any said subsurface conductive metal material,
establishing a threshold level of bridge balance below which substantially no said subsurface material is indicated and above which substantial metal subsurface material is indicated beyond the surface region as a result of larger magnitude eddy currents excited therein by said one of said inductances,
detecting change in balance of said bridge circuit exceeding said threshold level as a result of eddy current excitation in response to loading provided to said one of said inductances by said eddy currents, the degree of unbalance increasing with conductive metal thickness, for the purpose of detecting said subsurface metal material, and
providing an indication to an operator when said threshold level is exceeded.

5. Apparatus for testing for the presence of subsurface conductive metal material within a body, comprising:
a first inductance coil adapted for positioning in close proximity to the surface of said body,
a second inductance coil disposed in the same general environment as the first inductance coil but away from the surface of said body,
means for completing a bridge circuit with said first and second inductance coils,
alternating current oscllator means coupled to a pair of opposite terminals of said bridge circuit for applying an alternating current thereto at a frequency less than 10 KHz to induce eddy currents in said body while minimizing skin effects so that eddy currents are not induced only superficially in said body,
bridge circuit output means connected to conjugate terminals of said bridge circuit for sensing the output of said bridge, said output increasing with increase in the depth of conductive metal material adjacent said first inductance coil due to the increase in eddy currents induced therein,
means for establishing a threshold level relative to the output sensed by said bridge circuit output means wherein said threshold level is established to eliminate the effect of eddy currents induced only superficially of said body,
and means responsive to said bridge circuit output means and said threshold level establishing means for providing an indication of the presence of said subsurface conductive metal material when output of said bridge exceeds said threshold level.

6. The apparatus according to claim 5 wherein said bridge circuit includes said first and second inductance coils in first and second legs thereof and resistances in thrid and fourth legs thereof, said pair of opposite terminals having said first and second legs disposed in series therebetween, and said conjugate terminals being located respectively at the interconnection of said first and second legs, and at the interconnection between said third and fourth legs.

7. The apparatus according to claim 5 wherein said alternating current means operates at a frequency of approximately 4.5 KHz.

8. The apparatus according to claim 5 including a half pot core upon which said first inductance coil is wound, and means mounting said half pot core with an open end positionable toward said surface of said body.

9. The apparatus according to claim 8 including a case for housing said apparatus and having a lower panel of insulating material, said half pot core being mounted open end downward on said panel.

10. The apparatus according to claim 8 including a second half pot core upon which said second inductance coil is wound, said second half pot core being mounted back-to-back with the first mentioned half pot core.

* * * * *

UNITED STATES PATENT AND TRADEMARK OFFICE
CERTIFICATE OF CORRECTION

PATENT NO. : 4,847,552
DATED : July 11, 1989
INVENTOR(S) : Bruce S. Howard

It is certified that error appears in the above-identified patent and that said Letters Patent is hereby corrected as shown below: On the title page:

Abstract, line 1, after "layer" insert --or the like--.

Column 2, line 54, "provdie" should be --provide--.

Column 3, line 56, "200" should be --20--;

lines 58-59, "Potentiometes" should be --Potentiometers--.

Column 4, line 16, "sothat" should be --so that--;

line 19, "of" should be --or--;

line 60, "th" should be --the--.

Column 6, line 27, "thrid" should be --third--.

Signed and Sealed this

Twenty-fourth Day of April, 1990

Attest:

HARRY F. MANBECK, JR.

*Attesting Officer*     *Commissioner of Patents and Trademarks*